United States Patent [19]

Berthier

[11] 4,229,866
[45] Oct. 28, 1980

[54] FRAME SUPPORT FOR TOOL HEAD

[76] Inventor: Pierre Berthier, Le Collenon, 42320 La Grand Croix, Loire, France

[21] Appl. No.: 7,353

[22] Filed: Jan. 25, 1979

[30] Foreign Application Priority Data

Jan. 31, 1978 [FR] France .............................. 78 03450
May 18, 1978 [FR] France .............................. 78 15377

[51] Int. Cl.$^3$ .......................... B23B 39/14; B23C 1/00
[52] U.S. Cl. ................................. 29/26 A; 408/234; 409/235
[58] Field of Search .................... 408/31, 32, 234; 409/235, 236, 238; 29/26 A

[56] References Cited

U.S. PATENT DOCUMENTS

| | | | |
|---|---|---|---|
| 3,154,979 | 11/1964 | Crispin | 408/234 X |
| 3,296,901 | 1/1967 | Sawada | 408/234 X |
| 3,455,205 | 7/1969 | Pankonin et al. | 409/235 X |
| 3,653,159 | 4/1972 | Ladewig | 409/235 X |
| 3,848,513 | 11/1974 | Manyek | 409/235 X |
| 3,998,127 | 12/1976 | Romez | 408/234 X |

FOREIGN PATENT DOCUMENTS

| | | | |
|---|---|---|---|
| 1298838 | 7/1969 | Fed. Rep. of Germany | 408/234 |
| 559607 | 2/1944 | United Kingdom | 408/234 |

Primary Examiner—William R. Briggs
Attorney, Agent, or Firm—Haseltine, Lake & Waters

[57] ABSTRACT

Support apparatus for a movable tool head drive for a machine tool comprising a stand on which is fixed, a table on which is slidably movable, a framework comprising an upper transverse member which supports a movable tool head. The framework is in the form of a closed vertical frame having spaced vertical posts and a lower transverse member mounted below the table, the vertical posts being joined by the upper and lower transverse members to provide the closed configuration of the frame.

15 Claims, 8 Drawing Figures

FRAME SUPPORT FOR TOOL HEAD

FIELD OF THE INVENTION

The present invention concerns machine tools and in particular to the structure of certain constituent portions.

PRIOR ART

In machine tools enabling, in general, the operations of boring, screwing, reaming found in mechanical construction, it is well known that their general structure comprises a support frame for parts whose lateral sides enable the guiding and the displacement of the ends of posts of a movable arch. This latter enabling by its upper transverse member the mounting of a movable tool head with means for guiding and longitudinal displacement. Such machines thus enable the use of the tool along three coordinate with respect to the part to be machined affixed on the integral plate of the stand.

By their conception these machines present notable inconveniences especially with respect to the lack of precision of the displacements. In effect, the considerable stresses produced during the machining operation of the one or more tools are translated by a certain deformability of the arch forming the bridging portion which is translated onto its guiding means thus causing an irregular displacement with respect to the frame and consequently deviations in the positioning of the axis of the spindle of the tool holder with respect to the axis of the stand.

Moreover, the arrangement of the tool head with a rear vertical guiding surface cooperating with the extreme vertical side of the transverse member of the movable arch is also translated by abnormal stresses on the slides of the said transverse member in combination with the deformability of the arch, contributing to negate the precision of the machining.

SUMMARY OF THE INVENTION

According to the invention, it is desired to confer on these types of machines a great sturdiness and a better resistance to deflection, in such a way as to obtain a precision of the movements directly enabling the operations of machining without recourse to preliminary operations of tracing, leveling . . . etc.

According to a first characteristic of the invention, the stand of the machine is made integral with its principal upper surface with a longitudinal slide arranged rigorously in the vertical median plane and with two symmetrically placed lateral slides, cooperating with the lower portion of a moveable framework forming a closed frame and of which the upper portion constitutes the bed for guiding and displacement of the movable tool head.

According to another characteristic, the movable frame work forms a profiled lower transverse member having axially and preferably at its upper portion a slot provided along its opposing surfaces with rolling or sliding elements cooperating with the corresponding surfaces of the central slide of the stand in such a way as to rigorously ensure its straightness of horizontal displacement in the vertical median plane of the framework.

According to another characteristic, the extremities of the lower portion of the movable framework, forming a non-deformable closed frame, receive means for rolling or sliding contact cooperating with the opposed horizontal surfaces of the lateral slides with the object of ensuring the vertical guiding with respect to the stand.

According to another characteristic, the lower transverse member of the movable framework permits the mounting of the maneuvering screw for its displacement control in the same vertical median plane and the exterior attachment of a reading index cooperating with an element of axial measurement integral with the stand to enable the direct or controlled reading.

According to another characteristic, the guiding bed of the movable framework has an inclined planar support surface enabling the sliding displacement of the movable tool head in such a way that the result out of the stress transmitted during machining, passes in the horizontal plane of the framework in such a way as to ensure its perfect and regular seating on the slides with respect to the stand; the said inclined planar surface comprising, in addition, laterally and symmetrically fixed slides cooperating by their adjacent surfaces, with rolling or sliding means integral with the said movable head and arranged symmetrically with respect to the axis of the maneuvering screw for displacement control; a reading index integral with the head and arranged perpendicularly to the surface of the inclined support of the bed and in the plane of the said maneuvering screw cooperating with a measuring element integral with the transverse member for all reading devices.

According to another characteristic, the lower profiled transverse member of the vertical frame, is equipped with shoes traversing housings formed along its entire height and driven freely by the displacements in translation of the said frame with respect to the stand and to the plate; the said shoes preferably with projections, bearing directly on the lateral and horizontal supports formed or inserted on the stand and at their upper surface on the horizontal and corresponding seats formed laterally or added under the lower surface of the plate.

These characteristics and others will be evident from the following description.

BRIEF DESCRIPTION OF THE DRAWINGS

To show the object of the invention without however limiting it, in the attached drawings.

DETAILED DESCRIPTION

Figure 1:
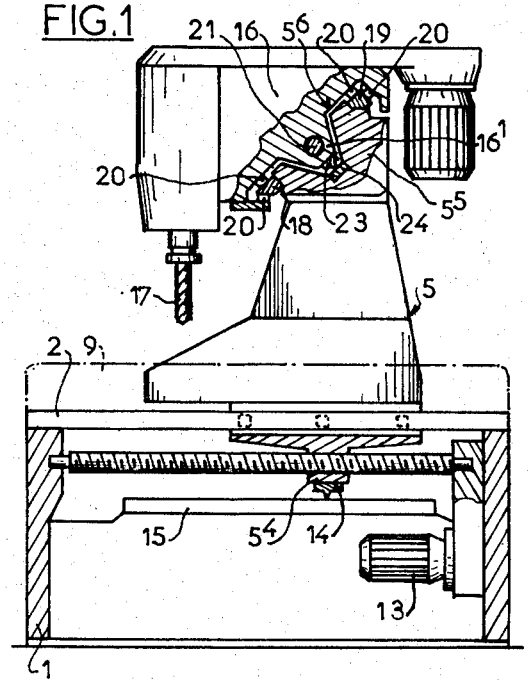
FIG. 1 is a front view, partially broken away and in section of the movable vertical frame equipped with the movable tool head with guiding and measuring means.
Figure 2:
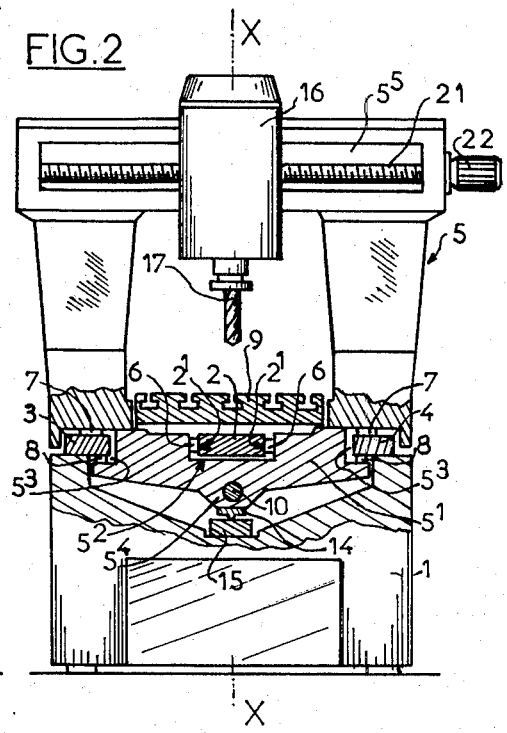
FIG. 2 is a side view, partially broken away and in section corresponding to FIG. 1.

In order to make the object of the invention more clear, it will now be described in a non-limitative manner with reference to the embodiments illustrated in the figures of the drawings.

According to the present invention, the signal 1 of the machine comprises opposite its upper support surface a longitudinal and central slide 2 preferably of rectangular section, rigorously arranged axially in the vertical median plane X—X and permanently affixed by any known means and enabling its adjustment in judicious position.

Two slides 3 and 4 of any appropriate section are also arranged on the stand 1, symmetrically and laterally with respect to the slide 2 and preferably in the same horizontal plane.

The slides 2, 3 and 4 allow the longitudinal displacement by sliding with respect to the stand 1, of a framework 5 supporting at its upper transverse member the movable tool head. The framework 5 is shown as a closed vertical frame thereby having the characteristics of rigidity and non-deformability both vertically as well as horizontally. The framework 5 comprises a lower transverse member $5^1$ judiciously profiled with an axial slot $5^2$ cooperating with the central slide 2. The slot $5^2$ is provided along its opposed surfaces with rolling or sliding means 6 cooperating with the lateral and parallel surfaces $2^1$ of the slide 2 for rigorously ensuring, with precision, the straightness of the horizontal displacement of the framework 5 opposite along its vertical median plane.

The extremities of the lower transverse member $5^1$ are provided with longitudinal hollows or corridors $5^3$ receiving rolling or sliding means 7-8, cooperating with the opposed horizontal surfaces of the slides 3 and 4 in order to provide precise support and of vertical guiding the framework 5 with respect to the stand. This horizontal and axial guiding of the framework combined with the vertical and lateral guiding enables obtaining, with precision, the straightness of its displacement with respect to a table or plate 9 affixed on the stand 1 and arranged between the legs or posts of the framework 5 and overlapping the slide 2.

It is also notable to consider that the lower transverse member $5^1$ of the mobile framework supports, in the same vertical median plane X—X, the nut of the maneuvering or drive screw 10 of the framework 5. The screw 10 is mounted in free rotation on the stand 1 and is driven in rotation by a motor 13 optionally connected to a control mechanism (not shown).

An index 14 also affixed along the median plane X—X on an exterior surface on the corresponding boss $5^4$ of the lower transverse member $5^1$ cooperates with an axial measuring element 15 integral with the stand in order to enable direct or controlled reading.

A transverse member $5^5$ of the movable framework constitutes a guiding bed of the movable tool head 16 driven in known manner in a transverse sliding movement and carrying a tool 17.

To this effect, the guiding bed forms at its upper portion an inclined planar surface $5^6$ for the support and free sliding of the inclined rear portion of complementary shape of the mobile head 16. It should be noted that the position of the inclined guiding surface $5^6$ of the head 16 with respect to the transverse member $5^5$ is such that the resultant of the vertical stresses produced by the working of the tool passes in a horizontal plane of the framework 5 in such a way as to ensure its perfect seating on the lateral slides 3 and 4 integral with the stand without any risk of local wear or deformation which could lead to detrimental play adversely affecting precision.

The guiding of the movable head 16 is obtained by lateral and symmetrical slides 18 and 19 affixed on the profiled and opposite sides of the upper transverse member $5^5$ and whose adjacent surfaces cooperate with rolling or sliding means 20 integral with the head 16. A maneuvering or drive screw 21 arranged perpendicularly with respect to the inclined plane $5^6$ and symmetrically with respect to the slides 18-19 cooperates with a nut housed in an axial boss $16^1$ of the movable head 16 while being maintained longitudinally by bearings in the upper transverse member $5^5$. A motor 22 produces driving movement of screw 21.

The axial boss $16^1$ of the movable head 16 serves for the attachment of a reading index 23 arranged perpendicularly with respect to the plane $5^6$ and in a plane passing through the axis of the screw 21 for cooperation with a measuring element 24 integral with the transverse member $5^5$ for direct or controlled reading.

Figure 4:
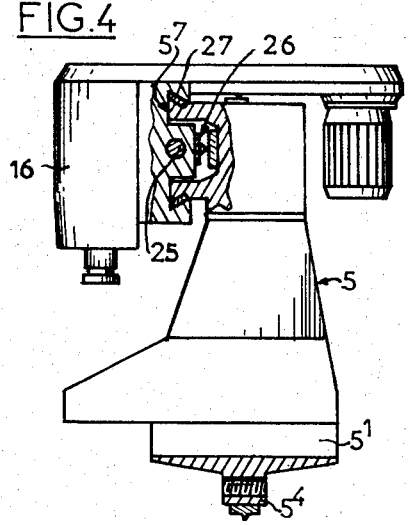
FIG. 4 is a partial front view of an embodiment of the vertical frame provided with the movable tool head drive with support surface perpendicular to the plate integral with the stand.
Figure 3:
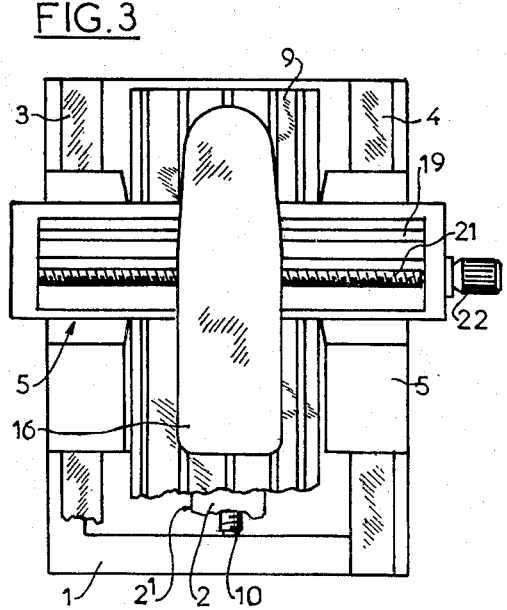
FIG. 3 is a top plan view corresponding to FIG. 2.

In the variation illustrated in FIG. 4, the framework 5 constituting the closed vertical frame can form by the guiding bed of its upper transverse member a vertical support surface $5^7$ of the movable head 16 with maneuvering screw 25 and reading index 26 arranged axially with respect to the opposed slides 27.

Figure 5:
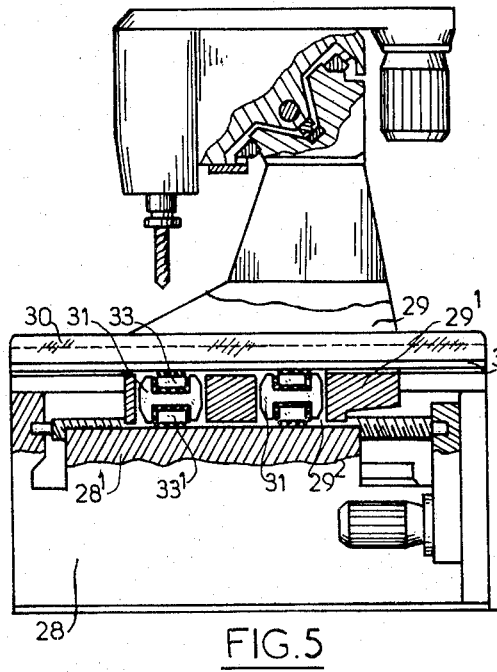
FIG. 5 is a front view, partially broken away and in section section of the movable vertical frame equipped with the tool head and of the bearing means of the table-plate, according to another embodiment.
Figure 6:
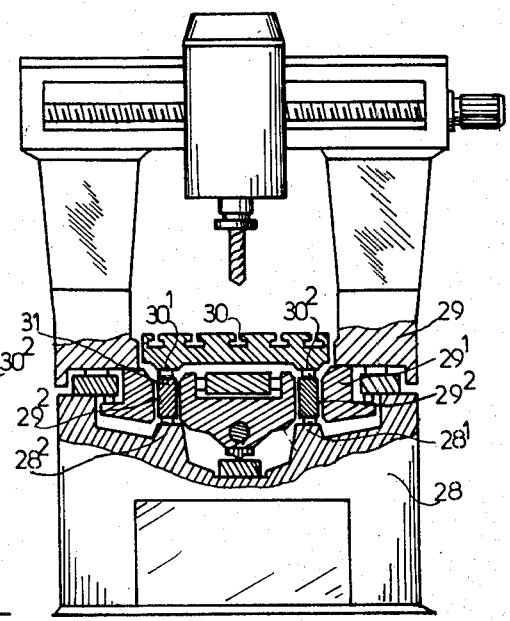
FIG. 6 is a side view, partially broken away and in section section, corresponding to FIG. 5.
Figure 8:
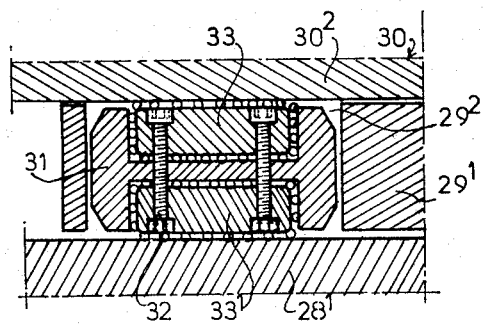
FIG. 8 is a view of a detail and in section, illustrating the mounting of the shoes with projections in a groove of the lower transverse member of the vertical frame.
Figure 7:
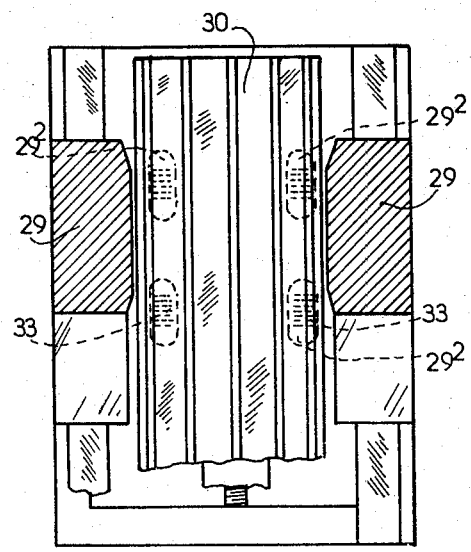
FIG. 7 is a top plan view, in partial section, corresponding to FIG. 6.

According to another embodiment as seen in FIGS. 5 and 6, the stand 28 of the machine comprises two longitudinal bosses $28^1$ and $28^2$ disposed laterally and symmetrically, below the lower transverse member $21^1$ of the movable framework 29 forming a closed vertical frame, said two longitudinal bosses $28^1$ and $28^2$ being arranged in a horizontal plane, and constituting two support bearings for supporting the loads or stresses transmitted by the plate 30 fixed on the frame 28, from its ends between the legs or posts of the framework 29, as indicated previously.

These bosses $28^1$ and $28^2$ constituting longitudinal bands, can be machined directly along their upper surfaces or optionally they can receive slides attached by any known means.

Along the same vertical planes formed by the bosses $28^1$ and $28^2$, the plate 30 comprises at its lower surface and along its entire length, two longitudinal supports $30^1$ and $30^2$ constituted directly by two prominent machined bands along their lower surfaces, or by added support guide bars. The longitudinal supports $30^1$ and $30^2$ transmit the loads to the bosses $28^1$ and $28^2$ of the stand 28, via shoes with projections 31.

To this effect, the lower transverse member $29^1$ of the framework 29 extends vertically along the common axes of the bosses $28^1$ and $28^2$ of the supports $30^1$ and $30^2$, and is provided with hollows or slots $29^2$ arranged along its height and in variable number, for receiving respectively an inserted rolling or sliding guiding means which is inserted between the bosses and opposed supports.

These guiding means driven freely in translation by the hollows $29^2$ of the lower transverse member $29^1$ do not undergo any stress during the displacements in translation of the production of movable framework 29, but act solely in support in the manner of intermediate wedges, during the stresses which act on the plate 30 in the vertical plane, in order to transmit the stresses directly to the stand 28.

This arrangement ensures a perfect flatness of the plate 30 whatever the load or support exerted by the tool.

According to the non-limitative embodiment, illustrated in the drawings, the vertical hollows or slots $29^2$ are of oblong shape, enable, respectively, the engagement by free sliding of a profiled plate member 31 enabling on both sides of its axial and horizontal core the engagement and the attachment by bolts 32, of two stops for the shoes with projections 33 and $33^1$ produced in known manner.

These stops arranged in superposition bear, on the one hand by their known surface on the corresponding bosses $28^1$ and $28^2$ of the stand 28, and on the other hand at their upper surface on supports $31^1$—$31^2$ arranged under the lower surface of the plate 30.

It is obvious that without departing from the scope of the invention, any guiding and support element freely housed or not in the hollows $29^2$, may be provided, such as roller shoes, ballbearings, sliding guide bars and the like. Moreover, these elements may comprise a thickness regulating means to be adapted without play between the bosses and supports.

It is also possible to envisage a number of support bands comprising one or several respective guiding elements, for all machines for which the tool is affixed to a closed frame normally limiting the support surfaces of a fixed table situated between the lateral posts.

The advantages of these arrangements are evident from the description and it is emphasized in particular:

the great sturdiness of the closed frame constituting the framework, combined with the axial guiding and lateral support with respect to the stand for ensuring rigorously straight displacements;

the perfect seating of the framework in the vertical plane with respect to the stand as a result of the inclined arrangement of the sliding plane of the movable tool head; and the displacement controls and the direct readings of the framework and of the movable tool head arranged rigorously along the axis of symmetry of the slides.

The invention is in no way limited to that of its means of application nor to those of its embodiments of its various parts having more specially been indicated; it embraces, on the contrary, all variations falling within the scope of the appended claims.

I claim:

1. Support apparatus for a movable tool head drive for a machine tool, said apparatus comprising a stand, a table or workplate fixed on said stand for support of a workpiece, a movable framework slidably supported by said stand and capable of movement relative to said table, said framework comprising an upper transverse member which supports a movable tool head adapted for support of a tool which is to operate on the workpiece, means for control, guidance and displacement of said framework and movable tool head with respect to said stand and the table, said framework comprising a closed vertical frame having spaced vertical posts and a lower transverse member mounted below said table of the machine, said vertical posts being joined by said upper and lower transverse members to provide the closed configuration of said frame.

2. Support apparatus as claimed in claim 1 comprising a longitudinal slide mounted on said stand in a vertical median plane thereof and two lateral slides mounted symmetrically on said stand on opposite sides of said vertical plane, said lower transverse member of said framework being slidably supported by said slides.

3. Support apparatus as claimed in claim 2 wherein said lower transverse member has an axial slot with opposite lateral surfaces, and bearing means in said surfaces cooperating with corresponding surfaces of said longitudinal slide on the stand to insure the straightness of displacement of said framework.

4. Support apparatus as claimed in claim 2 comprising bearing means on said posts at the lower ends thereof for contacting said lateral slides for vertical guidance and displacement of said frame with respect to said stand.

5. Support apparatus as claimed in claim 1 comprising a boss on said lower transverse member situated in said median plane, a drive screw for said frame extending in said boss, and external reading index on said boss and an axial measuring element integral with said stand and cooperating with said index.

6. Support apparatus as claimed in as claimed in claim 2 wherein said upper transverse member has an inclined, planar support surface forming a guiding bed for displacement of said movable tool head such that the resultant of stresses transmitted to said head during machining, are transmitted in a horizontal plane in said framework for insuring seating thereof on said lateral slides.

7. Support apparatus as claimed in claim 6 comprising laterally and symmetrically fixed slides on said inclined planar support surface of the said upper transverse member, bearing means integral with said movable head and supported on said slides a drive screw arranged symmetrically with respect ot said slides and threadably supported into said head, a reading index on said movable head cooperating with a measuring element fixed on said upper transverse member for reading displacement of said movable head.

8. Support apparatus as claimed in claim 2 wherein said upper transverse member has a vertical planar support surface forming a guiding bed for displacement of said tool head, a drive screw threadably engaging the tool head and reading index means for reading displacement of said head.

9. Support apparatus as claimed in claim 1 wherein said upper transverse member of the closed frame has an inclined planar support surface with slide means thereon for guidable support of said movable head, and control means including a median drive screw for displacing said head with respect to said slide means.

10. Support apparatus as claimed in claim 9 wherein said upper transverse member includes element measuring means for reading displacement of said movable head with respect to said upper transverse element.

11. Support apparatus as claimed in claim 1 comprising bearing means on said lower transverse member freely traversing housings formed along the entire height of said transverse member and freely driven upon displacement in translation of said framework with respect to said stand and the fixed table thereon, said bearing means comprising shoes bearing directly on said stand and on said table to transmit vertical stresses exerted on said plate directly to said stand.

12. Support apparatus as claimed in claim 11 wherein said stand comprises lateral bosses laterally and symmetrically below said lower transverse member of said closed framework, said lateral bosses supporting said shoes.

13. Support apparatus as claimed in claim 12 wherein said table comprises along its lower surface, lateral bands constituting upper points of support of said shoes for transmission of vertical stresses directly to said stand.

14. Support apparatus as claimed in claim 13 comprising a profiled plate slidably engaged in said housings in said lower transverse member, two of said shoes being attached to said plate and including projections.

15. Support apparatus as claimed in claim 14 wherein said bands and bosses are arranged symmetrically.

* * * * *

UNITED STATES PATENT AND TRADEMARK OFFICE
Certificate

Patent No. 4,229,866                                                                              Patented: Oct. 28, 1980

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
George Moulin Signed and Sealed this Twentieth Day of November 1990.

HOWARD N. GOLDBERG

*Supervisory Patent Examiner*
*Art Unit 326*